July 13, 1926.
S. P. WILBUR
HYDROMETER
Filed Nov. 7, 1921
1,592,478
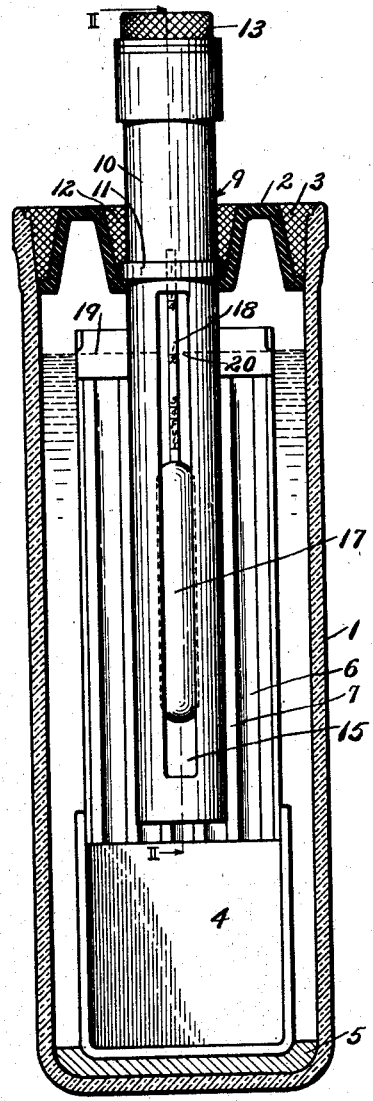
Fig. I.
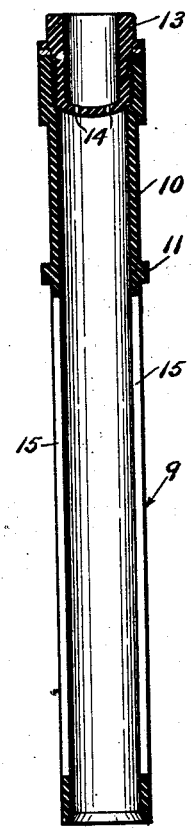
Fig. II.
Fig. III.
INVENTOR.
Samuel P. Wilbur
BY Chester W. Braselton
ATTORNEY Patented July 13, 1926.

1,592,478

UNITED STATES PATENT OFFICE.

SAMUEL P. WILBUR, OF TOLEDO, OHIO, ASSIGNOR, BY MESNE ASSIGNMENTS, TO THE ELECTRIC AUTO-LITE COMPANY, OF TOLEDO, OHIO, A CORPORATION OF OHIO.

HYDROMETER.

Application filed November 7, 1921. Serial No. 513,260.

This invention relates to density indicating apparatus, wherewith the specific-density of a liquid is determinable by the degree of immersion therein of buoyant body.

The invention has particular utility when applied to storage batteries, the degree of charge varying with the specific density of the electrolyte. As applied to this particular use, I employ one of a battery group as a pilot cell, and in a suitable portion thereof I insert a guide tube in which the hydrometer float has free vertical movement between the limits of charge and discharge.

An important object of the invention has been to devise suitable density indicating apparatus for storage batteries and other liquids subject to recurrent and constant density changes which would not be subject to a cumulative error in its indication, as distinguished from ampere hour meters, which have been largely used for batteries, and which are subject to a cumulative error due to the fact that the meter operates more rapidly on the discharge than on the charge, thus admitting an error which is impossible to completely obviate.

An object also is to construct density indicating apparatus which may readily be distinguished and interpreted from a marked distance therefrom, or where the illumination is weak.

Another object considered is the provision of indicating means which are a composite part of the battery and normally unremovable therefrom without some degree of manipulation, thus obtaining a constantly present and operative indicator and permitting the elimination of separable devices.

Further objects and objects relating to economies of manufacture and details of construction will become apparent as I proceed with the detailed description of one embodiment of my invention—which may be preferred—illustrated in the accompanying drawing and in which—

Figure I is an end view of a pilot cell of a storage battery showing the indicator in place;

Figure II is an axial section of the guide tube taken on lines II—II of Figure I; and Figure III is an elevation of the hydrometer.

The pilot cell 1 carries a corrugated hard rubber cover 2 sealed thereto by soft rubber gaskets 3. Within the cell the porcelain rest 4, permanently imbedded in sealing compound 5 supports firmly the usual lead plates 6 which are separated by wooden plates 7. The head plate unit terminates at the end of the cell so as to leave space for the indicator unit 9, which latter is clearly visible through the glass wall of the cell.

The indicator unit 9 is tubular in form and includes a guide tube 10 made preferably of a celluloid composition, although glass and rubber or other materials are readily usable. The tube 10 carries an integral external support ring 11 which rests on the cover 2, as clearly indicated in Figure I. Rigidity to this support is obtained through the use of a soft rubber gasket 12 enclosing the tube 10 directly above the cover 2. The upper end of the tube extends above the cell cover and is enlarged to receive a non-corrosive hollow plug 13, such as rubber, the inner base of which is apertured at 14 to secure ventilation. The tube in the cell interior is slotted oppositely as at 15 whereby free movement of the electrolyte through the tube is obtained with resultant equalization of density and temperature and accuracy of indication.

Within the tube 10 and movable in juxtaposition with the slots 15 is the indicating hydrometer 16. This hydrometer conforms largely to convention in form including a weight tube 17 for lowering the mass center and an indicating stem 18. As illustrated the stem 18 of the hydrometer is suitably sub-divided into sections having indicia for the proper identification of the corresponding liquid density. The terms employed are "Empty" at the top and "Full" at the bottom while in between these limits the fractions "¼", "½" and "¾" are interposed on opposite sides to provide for accidental rotation of the stem. For the purposes of this invention the points of indication are approximate informing the attendant that within the reading visible the density and the corresponding charge approximates the indication, and to aid the visibility especially for the limit areas, the "Empty" section of the stem is red colored and the "Full" section is blue colored. The point of reading of the stem 18 is the liquid level 19 indicated by dotted line, although an arbitrary point on the tube 10 may be selected at which readings are made. It is thus apparent that in case of approximate discharge red shows at the visibility gap 20, while on approximate complete charge, blue will show at this point. Intermediate the "Full" and "Empty" sections the stem 18 is preferably uniformly colored to distinguish from the end sections.

In addition to the side slots 15 in the guide tube 10, the lower end of the tube is open as at 21 so that the equalizing convection movements of the liquid are provided for.

While I have described the illustrated embodiment of my invention in detail I do not desire to be limited thereto, but rather and only as limited by the claims hereto appended.

I claim as my invention:

1. In a density indicator for liquids, a liquid container; a guide tube depending within said container, said tube having longitudinal slots formed on opposite sides thereof; and a hydrometer movable within said guide tube in proximity to said slots, said hydrometer having homogeneous sections thereon of contrasting colors visible through said slots whereby the degree of density of the liquid may be approximately determined.

2. In a density indicator for liquids, a liquid container; a guide tube depending within said container, said tube having longitudinal parallel slots formed on opposite sides thereof adapted to extend below and above the surface of the contained liquid; and a hydrometer movable within said guide tube in proximity to said slots, said hydrometer having homogeneous sections thereon of contrasting colors visible through said slots above said liquid whereby the degree of density of the liquid may be approximately determined.

3. In a device of the class described, the combination of a liquid container having a support plate formed in the top thereof; a guide tube mounted on the supporting plate so that a portion thereof extends above and a portion below the same into the interior of the container; a hydrometer movably mounted within the guide tube; and means for securely fastening said guide tube to said support.

4. In a device of the class described, the combination of a liquid container having a closed top portion; a guide tube supported by said top portion and extending within the interior of the container, the base of said guide tube being permanently open; and a stopper positioned within the top of said tube and closing the same, said stopper having apertures therein.

5. In a device of the class described, the combination of a liquid container; a hydrometer positioned within said container; and a guide tube enclosing said hydrometer and restricting lateral movement thereof, suspended from the top of said container, the base and sides of said tube being open whereby free movement of the liquid through the tube is made possible.

In testimony whereof, I affix my signature.

SAMUEL P. WILBUR.